United States Patent [19]

Runyan

[11] Patent Number: 4,511,211
[45] Date of Patent: Apr. 16, 1985

[54] PROJECTION SCREEN ANCHOR

[75] Inventor: William S. Runyan, Ames, Iowa

[73] Assignee: Iowa State University Research Foundation, Inc., Ames, Iowa

[21] Appl. No.: 436,470

[22] Filed: Dec. 13, 1982

[51] Int. Cl.³ ............................................. G03B 21/56
[52] U.S. Cl. .................................. 350/117; 248/309.4; 160/DIG. 16
[58] Field of Search ................... 350/117; 248/206 A; 160/DIG. 16, 290 R, 311

[56] References Cited

U.S. PATENT DOCUMENTS

| | | | |
|---|---|---|---|
| 2,604,159 | 7/1952 | Wright | 160/DIG. 16 |
| 2,643,840 | 6/1953 | Lanman | 248/205 A |
| 2,864,096 | 12/1958 | Garber | 160/DIG. 16 |
| 3,107,361 | 10/1963 | Glutting | 160/DIG. 16 |
| 3,205,772 | 9/1965 | Guske | 350/117 |
| 3,251,264 | 5/1966 | Jacobson | 350/117 |
| 3,942,868 | 3/1976 | Hoffbauer et al. | 350/117 |

Primary Examiner—Monroe H. Hayes
Attorney, Agent, or Firm—Zarley, McKee, Thomte, Voorhees & Sease

[57] ABSTRACT

A projection screen having spaced apart lateral edges and opposite upper and lower ends that is mounted at its upper end by appropriate support means to a wall and which has a means for releasably magnetically securing the lower end of the screen to the wall. By securing the lower end of the screen to the wall while the upper end of the screen is spaced apart from the wall, the keystone effect that occurs when an overhead projector is used to upwardly project an image onto a vertically hanging screen is eliminated.

8 Claims, 5 Drawing Figures

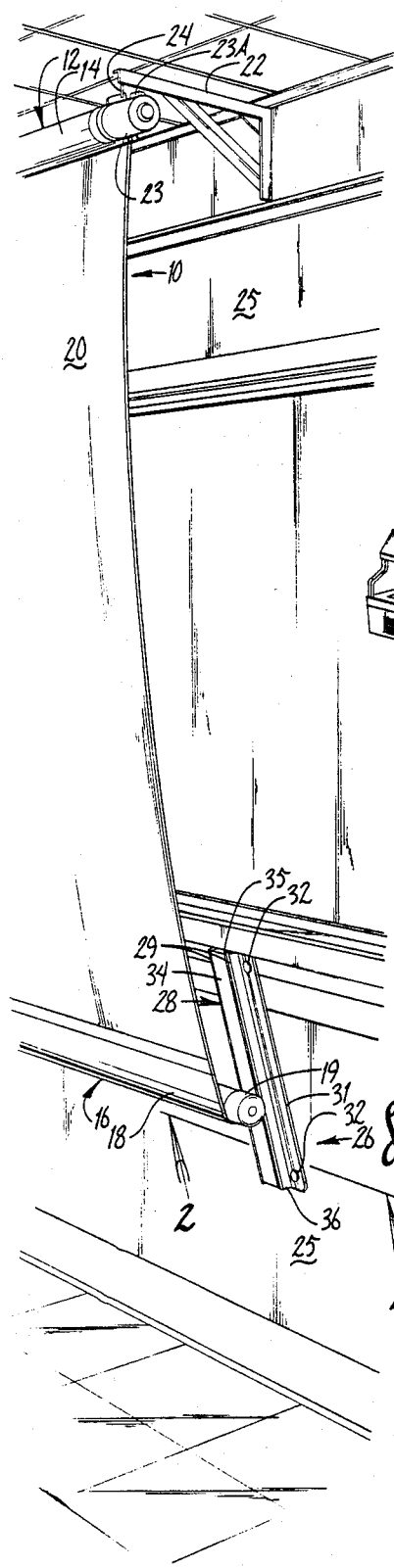
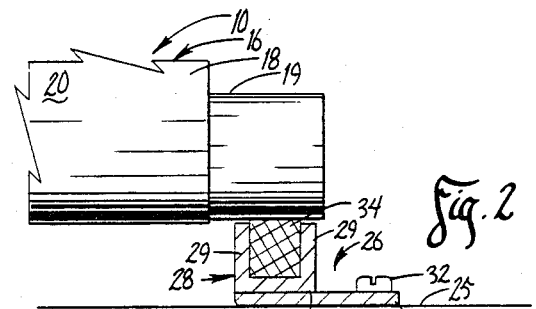
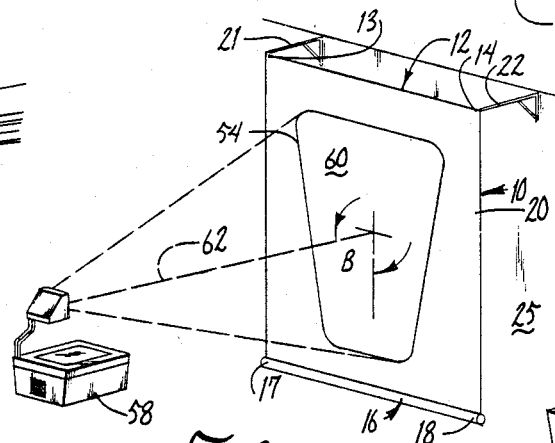
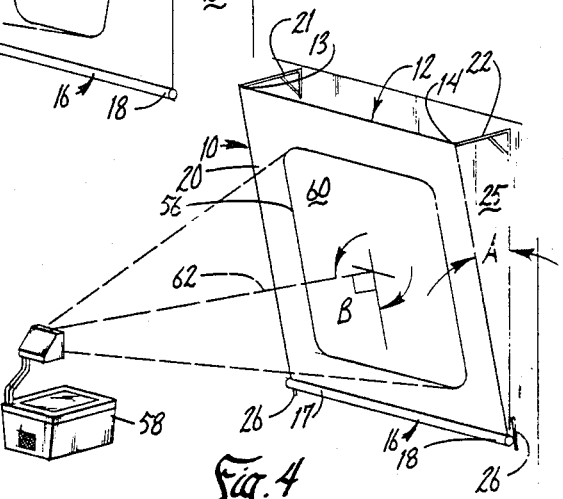
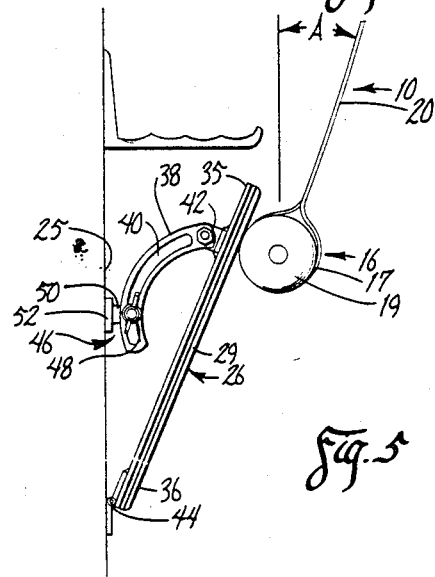

PROJECTION SCREEN ANCHOR

BACKGROUND OF THE INVENTION

Projection screens mounted by brackets so that the screen hangs away from the wall or chalkboard are commonly found in classrooms. In addition to use with photographic slides, these screens are often used to enlarge an image projected from an overhead projector. Most often, the overhead projector sits on a table such that the image is projected at an upward angle onto a vertically-hanging screen. This results in a "keystone" effect where the image is larger at the top of the screen than at the bottom of the screen and therefore is not entirely in focus. The "keystone" effect can be prevented by securing the bottom of the projection screen to the wall so that the plane of the screen is at a right angle to the line of projection. A simple string or chain can be used, but in cases where the projection screen is raised by an electric motor controlled by an automatic shut-off switch, the motor can be burned out if activated without unfastening the string or chain. A rubber band also could be used with the advantage that if the motor is activated without unfastening the rubber band, it will stretch and finally break, therefore preventing motor burn out. However, rubber bands are also unsatisfactory due to the varying size and strength.

It is therefore a primary objective of the present invention to provide an anchoring device that will simply and easily secure the bottom end of a projection screen to the wall so that when the projection screen is raised by an electric motor, the motor cannot be burned out.

It is a further object of the present invention to provide an anchoring device which magnetically secures the bottom end of a projection screen to the wall.

It is a further object of the present invention to provide a projection screen anchoring device that is easy to use, safe in operation, and economical to manufacture.

SUMMARY OF THE INVENTION

The projection screen anchor of the present invention magnetically secures the lower end of a projection screen, which is mounted at the top by brackets so that the projection screen is away from the wall or chalkboard, to the wall so that the screen is at an angle with respect to the wall. Such an orientation of the screen will prevent a "keystone" effect that occurs when an overhead projector upwardly projects an image onto a vertically-hanging projection screen. The projection screen anchor of the present invention permits the screen to be raised by an electric motor without unfastening the screen and without electric motor damage or burnout.

BRIEF DESCRIPTION OF THE DRAWINGS

FIG. 1 is a perspective view of a projection screen using the projection screen anchor.

FIG. 2 is a cross-sectional view of the projection screen anchor.

FIG. 3 shows the "keystone" effect resulting from an overhead projector projecting at an upwardly angle onto a vertically hanging screen.

FIG. 4 shows the absence of the "keystone" effect that is obtained when the bottom of the projection screen is anchored to the wall.

FIG. 5 is a an elevational view of an alternative projection screen anchor.

DETAILED DESCRIPTION OF THE DRAWINGS

Numeral 10 generally designates a projection screen having an upper end 12 having spaced apart edges 13 and 14 and a lower end 16 with spaced apart edges 17 and 18. Edges 17 and 18 each are covered by a metal cap 19. Projection screen 10 is mounted at its upper end 12 away from the wall 25 by mounting brackets 21 and 22, each bracket having a hook 24 which mountedly engages edges 13 and 14 to brackets 21 and 22 respectively.

A conventional electric motor 23 with a conventional automatic shut-off switch 23A and controlled by a remote control switch (not shown) as best shown in FIG. 1.

The projection screen anchor, generally designated by numeral 26, has a U-shaped portion 28 with outer flanges 29 and connecting portion 30. Integrally attached to the U-shaped portion 28 is a mounting flange 31. Screws 32 secure anchor 26 to a wall 25. Each anchor has an upper end 35 and a lower end 36. Sandwiched between outer flanges 29 of U-shaped portion 28 and extending the entire length of the anchor is a permanent magnet 34.

FIG. 5 shows an alternative construction of the projection screen anchor. The anchor has upper end 35 and lower end 36 with lower end 36 being attached to wall 25 by a hinge 44. A curved brace 28 having a slot 40 is attached by pin or rivet 42 to connecting member 30 towards upper end 35 of anchor 26. A guide pin 46 has a pin head 48, a pin stem 50, a mounting plate 52, and a shaft (not shown) connecting pin head 48 and pin stem 50. The shaft is slidably received in slot 40 and retained by pin head 48 such that upper end 35 of anchor 26 may be adjustably moved closer or further from wall 25 as needed.

In use, metal caps 19 on edges 17 and 18 of the lower end 16 of projection screen 10 are magnetically secured to anchor 26 by the permanent magnet 34. When an electric motor having an automatic shut-off switch is used to raise the screen, the end caps 19 slide up the anchors 26 and slip off upper ends 35 of anchors 26 with no strain on the electric motor and, thereby no risk of motor damage or burn out.

FIG. 3 shows a typical projection screen 10 mounted at its upper end 12 by mounting brackets 21 and 22. Lower end 16 of projection screen 10 hangs vertically and is parallel to wall 25. An overhead projector 58 upwardly projects an image 60 on screen surface 20. The angle B between the line of projection and the screen surface 20 is less than 90°, therefore resulting in the notably trapezoidal "keystone" effect. Image 60 is larger at the top of the screen than at the bottom of the screen and is therefore not entirely in focus.

FIG. 4 shows a projection screen 10 mounted at its upper end by brackets 21 and 22 and secured at its lower end 16 by anchors 26. Projection screen 10 is now oriented at an angle A with respect to wall 25. The overhead projector 58 upwardly projects image 60 onto the screen so that the angle B between the line of projection 62 and screen surface 20 is a right angle, thus producing no "keystone" effect. Image 60 is therefore in focus and all letters and numerals therein are of consistent size. The alternative construction of anchor 26 shown in FIG. 5 permits angle A to be varied as needed to produce the clearest image.

While the drawings have shown the metal caps releasably secured to magnets 34, the magnets could obviously be on the lower ends of the screen and in releasable engagement with metal wall brackets without departing from this invention. In such a case (FIGS. 1 and 2) metal cap 19 could be magnetic, and magnet 34 could merely be a metal bar.

It can be seen that the present invention accomplishes at least all of its stated objectives.

What is claimed is:

1. A projection screen comprising:
   a screen having spaced-apart lateral edges and opposite upper and lower ends;
   support means adapted to be attached to a wall and adapted to support said screen at said lateral edges of said upper end;
   a pair of elongated magnetic anchor means pivotally secured to said wall and extending upwardly and outwardly therefrom, said anchor means each having adjustment means thereon for selectively adjusting the angle of said anchor means with respect to the wall;
   and said lateral edges of said lower end of said screen each have a metal cap capable of magnetic engagement with said anchor means whereby, upon adjustment of said anchor means to an angle in nonintersecting relation with the top of the screen, adjustment of said lateral edges of said lower end of the screen longitudinally of said anchor means is operative to adjust the angle of the screen with respect to the wall.

2. A projection screen according to claim 1, wherein said metal caps include magnetic material and are releasably magnetically secured to said wall.

3. A projection screen according to claim 1 wherein said projection screen is raised and lowered by an electric motor having an automatic shut-off switch.

4. A projection screen according to claim 3 wherein said metal caps of said lower end of said projection screen slide upwardly and off of said anchor means when said electric motor is activated to raise said screen.

5. A projection screen according to claim 1 wherein said support means support said upper end of said screen away from said wall and said anchor means secure said lower end of said screen closer to said wall than said upper end of said screen, whereupon said screen produces no "keystone" effect when an image is projected upwardly from an overhead projector.

6. A projection screen, comprising:
   a screen having spaced-apart lateral edges and opposite upper and lower ends,
   support means adapted to be attached to a wall and adapted to support said screen at said lateral edges of said upper end,
   a pair of elongated magnetic anchor means secured to said wall and extending upwardly and outwardly therefrom in nonintersecting relation with the top of the screen,
   an electric motor operatively connected to said projection screen to raise and lower said screen, said motor having an automatic shut-off switch,
   said lateral edges of said lower end of said screen each having a metal cap capable of slidable magnetic engagement with said anchor means whereby sliding adjustment of said metal caps longitudinally of said anchor means is operative to adjust the angle of the screen with respect to the wall,
   said metal caps of said lower end of said screen sliding upwardly and off said anchor means when said electric motor is activated to raise said screen.

7. The projection screen of claim 6 wherein said anchor means is pivotally secured to said wall and has an adjustment means thereon for selectively adjusting the angle of said anchor means with respect to said wall.

8. A projection screen according to claim 6 wherein said support means support said upper end of said screen away from said wall and said anchor means secure said lower end of said screen closer to said wall than said upper end of said screen, whereupon said screen produces no "keystone" effect when an image is projected upwardly from an overhead projector.

* * * * *